(12) United States Patent
Ratni et al.

(10) Patent No.: US 12,100,901 B2
(45) Date of Patent: Sep. 24, 2024

(54) ANTENNA AND ANTENNA ARRANGEMENT

(71) Applicant: Sony Semiconductor Solutions Corporation, Atsugi (JP)

(72) Inventors: Mohamed Ratni, Stuttgart (DE); Masayoshi Abe, Stuttgart (DE)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 18/018,872

(22) PCT Filed: Jul. 27, 2021

(86) PCT No.: PCT/EP2021/070962
§ 371 (c)(1),
(2) Date: Jan. 31, 2023

(87) PCT Pub. No.: WO2022/028948
PCT Pub. Date: Feb. 10, 2022

(65) Prior Publication Data
US 2023/0307833 A1    Sep. 28, 2023

(30) Foreign Application Priority Data
Aug. 7, 2020    (EP) ..................................... 20189988

(51) Int. Cl.
*H01Q 5/25*    (2015.01)
*H01Q 13/04*   (2006.01)
*H01Q 21/28*   (2006.01)

(52) U.S. Cl.
CPC ............... *H01Q 5/25* (2015.01); *H01Q 13/04* (2013.01); *H01Q 21/28* (2013.01)

(58) Field of Classification Search
CPC ............ H01Q 5/25; H01Q 7/00; H01Q 13/04; H01Q 21/28
See application file for complete search history.

(56) References Cited

U.S. PATENT DOCUMENTS

| | | |
|---|---|---|
| 7,639,195 B2 | 12/2009 | Chen |
| 2002/0154064 A1 | 10/2002 | Barnes |
| 2005/0110687 A1 | 5/2005 | Starkie et al. |
| 2008/0174505 A1 | 7/2008 | Wong et al. |

(Continued)

FOREIGN PATENT DOCUMENTS

WO    2019/044570 A1    3/2019

OTHER PUBLICATIONS

International Search Report and Written Opinion mailed on Oct. 19, 2021, received for PCT Application PCT/EP2021/070962, filed on Jul. 27, 2021, 11 pages.

*Primary Examiner* — Hoang V Nguyen
(74) *Attorney, Agent, or Firm* — XSENSUS LLP

(57) ABSTRACT

An antenna comprises a coil element, a first metallic plate element, a second metallic plate element and terminals. The first metallic plate element and the second metallic plate element each have the shape of a triangle or an isosceles trapezoid. Further, the first metallic plate element and the second metallic plate element are mirror symmetric with respect to a symmetry plane that is perpendicular to the longitudinal direction. The antenna provides a wider area of use at small size and can thus be used for different transmission technologies, such as NFC and UWB.

20 Claims, 11 Drawing Sheets

(56) References Cited

U.S. PATENT DOCUMENTS

| | | |
|---|---|---|
| 2008/0238774 A1 | 10/2008 | Ratni |
| 2013/0088401 A1* | 4/2013 | Binkofski ................ H01Q 7/06 343/907 |
| 2014/0139380 A1 | 5/2014 | Ouyang et al. |
| 2019/0074577 A1 | 3/2019 | Kim et al. |
| 2019/0294948 A1 | 9/2019 | Ratni et al. |

* cited by examiner

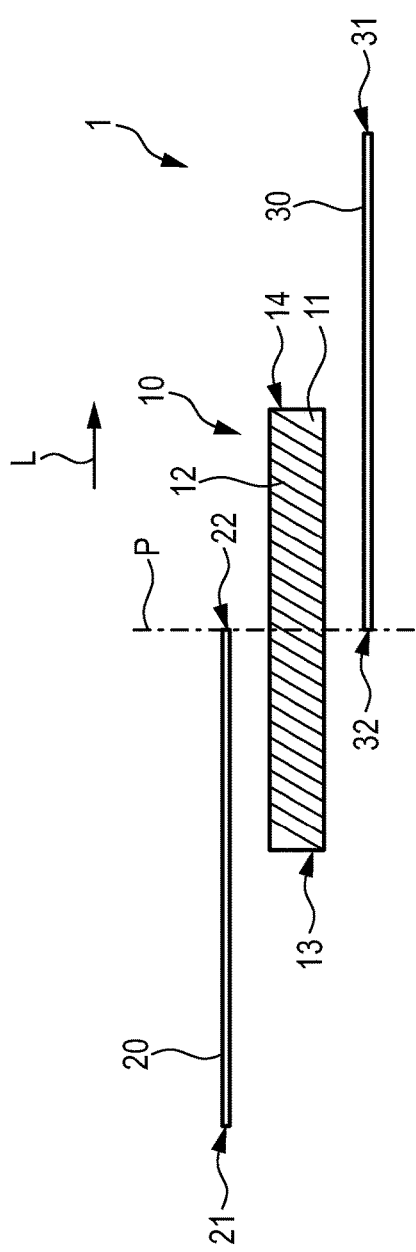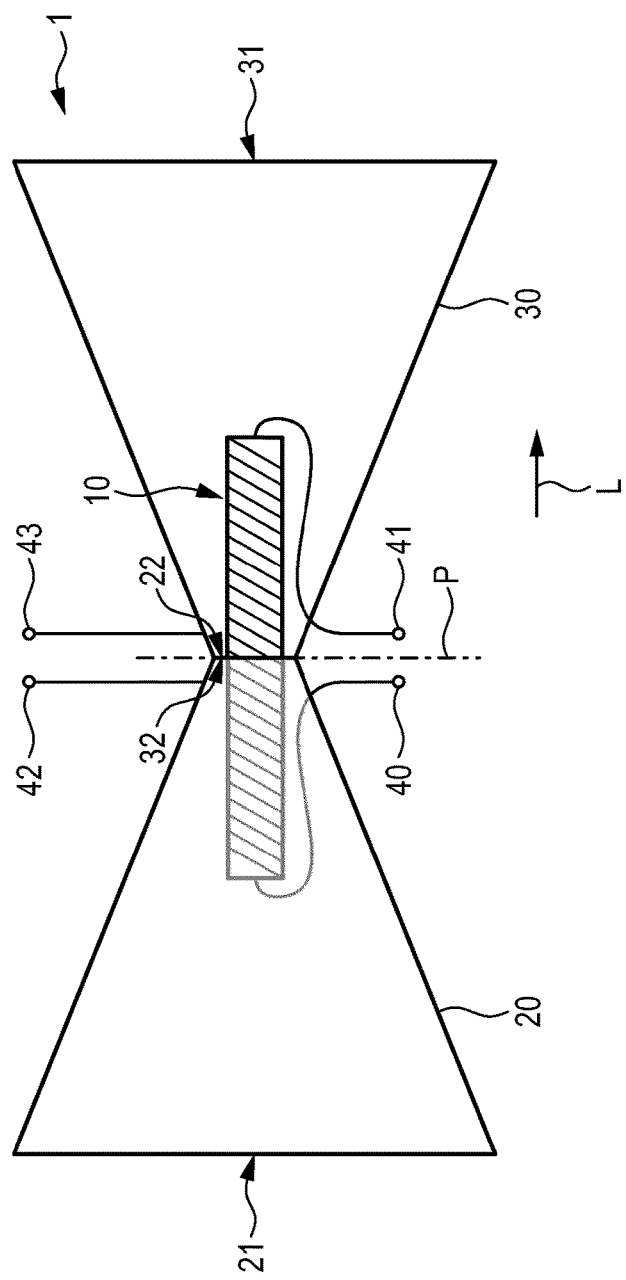

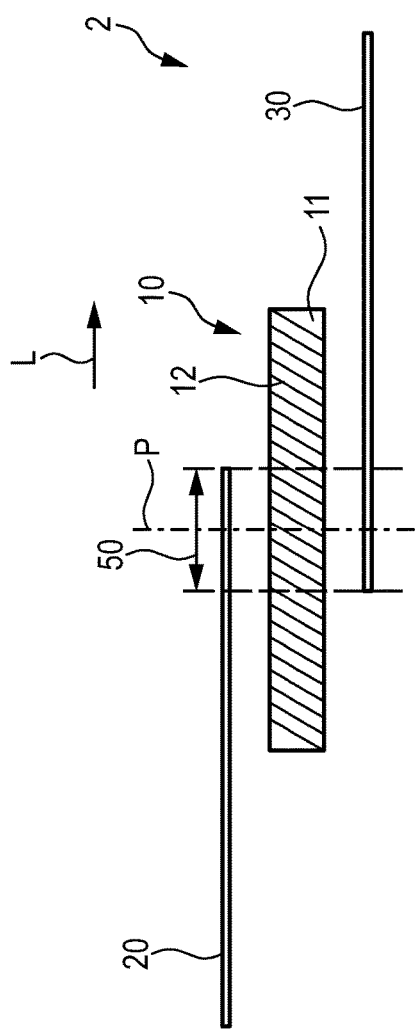
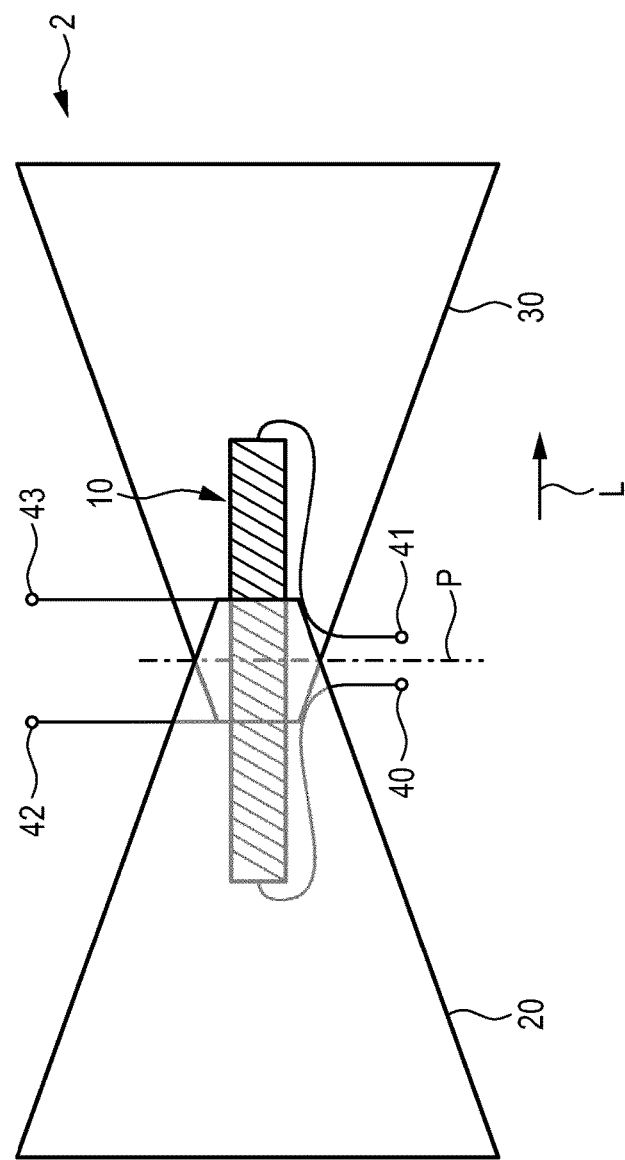

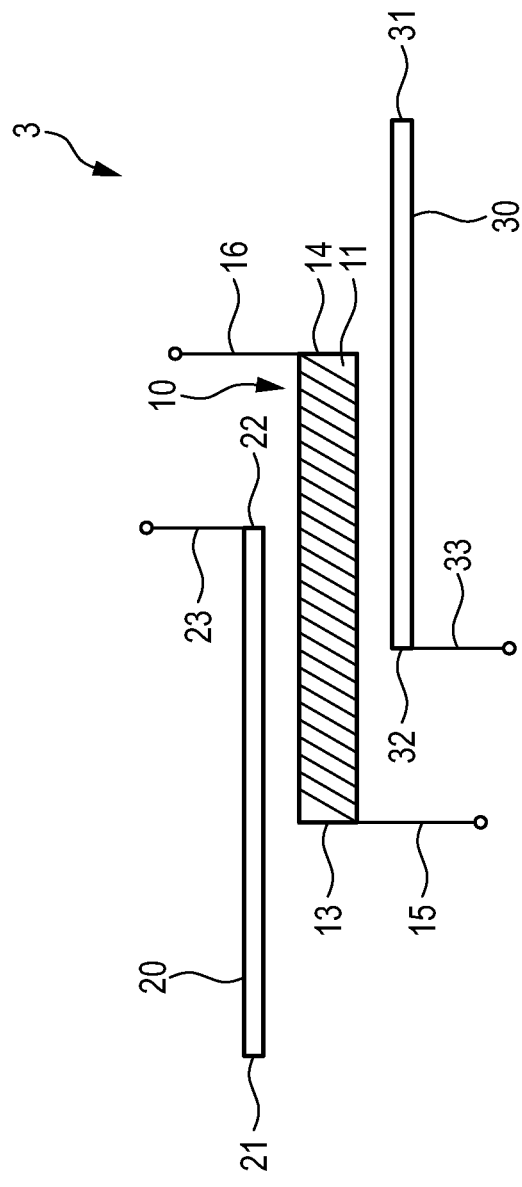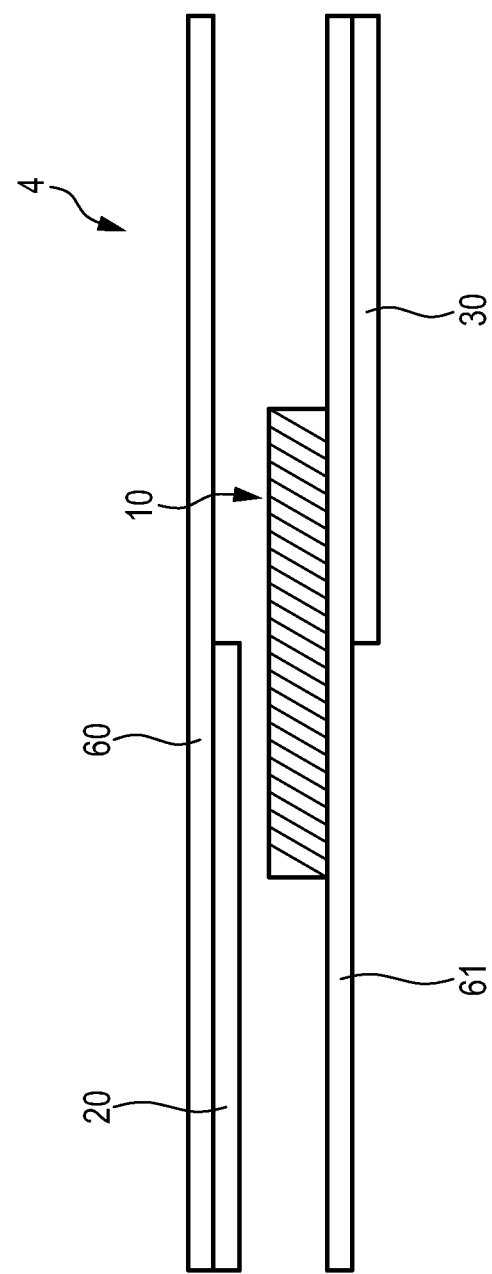

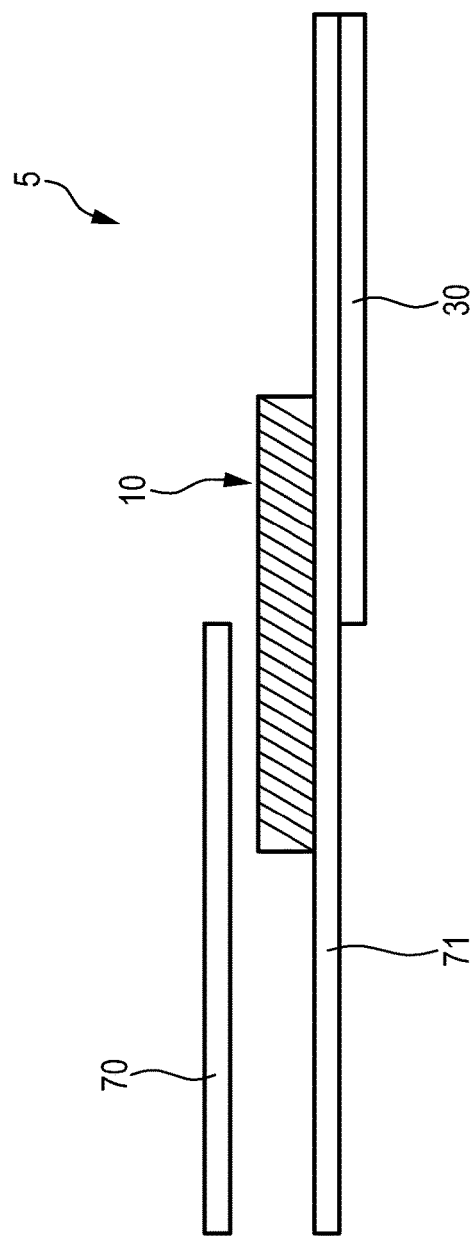
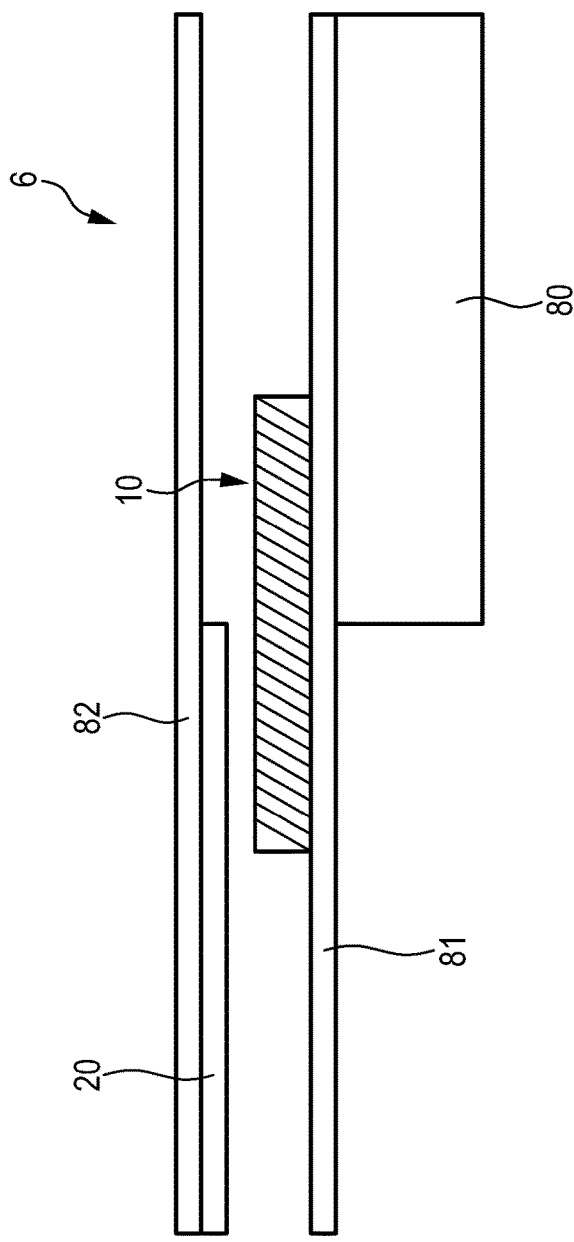

ANTENNA AND ANTENNA ARRANGEMENT

CROSS-REFERENCE TO RELATED APPLICATIONS

The present application is based on PCT filing PCT/EP2021/070962, filed Jul. 27, 2021, which claims priority to EP 20189988.7, filed on Aug. 7, 2020, the entire contents of each of which are incorporated herein by reference.

BACKGROUND

Field of the Disclosure

The present disclosure relates to an antenna and an antenna arrangement, in particular to a combination antenna.

Description of Related Art

US 2019/0294948 A1 discloses a small antenna, in particular for use in near field communication. The antenna comprises a coil element comprising a core element and coil wound around the core element, a first metallic plate element arranged on a first side of the core element and a second metallic plate element arranged on a second side of the core element.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide an antenna and an antenna arrangement providing a wider area of use at small size.

According to an aspect there is provided an antenna comprising
a coil element comprising a core element and coil wound around the core element, said core element being arranged along a longitudinal direction and having a first front surface and a second front surface,
a first metallic plate element arranged on a first side of the core element, wherein said first metallic plate element extends with its first end in said longitudinal direction beyond the first front surface of the core element and is arranged with its second end in said longitudinal direction adjacent the core element,
a second metallic plate element arranged on a second side of the core element opposite said second side, wherein said second metallic plate element extends with its first end in said longitudinal direction beyond the second front surface of the core element and is arranged with its second end in said longitudinal direction adjacent the core element,
a first terminal and a second terminal, both connected to the coil, and
a third terminal connected to the first metallic plate element and a fourth terminal connected to the second metallic plate element,
wherein the first metallic plate element and the second metallic plate element each have the shape of a triangle or an isosceles trapezoid and
wherein the first metallic plate element and the second metallic plate element are mirror symmetric with respect to a symmetry plane that is perpendicular to the longitudinal direction.

According to a further aspect there is provided an antenna arrangement comprising
an antenna as disclosed herein,
a first feeding circuit connected to the first and second terminals, the first feeding circuit being configured to feed a first signal to the coil, and
a second feeding circuit connected to the third and fourth terminals, the second feeding circuit being configured to feed a second signal to the first and second plate elements.

Embodiments are defined in the dependent claims.

One of the aspects of the disclosure is to provide a combination type antenna (also called combo type antenna) that is configured to transmit and/or receive RF signals of two different transmission technologies. The disclosed antenna is particularly configured for transmitting and/or receiving NFC (near field communication) signals and UWB (ultra-wideband) signals. This makes it possible to cover a larger frequency range in order to cover several communication technologies (such as NFC and UWB) as required e.g. in many modern communication devices such as smartphones or tablets.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIGS. 1A, 1B show a cross-sectional side view and a top view of a first embodiment of an antenna according to the present disclosure.

FIGS. 2A, 2B show a cross-sectional side view and a top view of a second embodiment of an antenna according to the present disclosure.

FIGS. 10A-10D show cross-sectional side views of further embodiments of an antenna according to the present disclosure.

DETAILED DESCRIPTION OF THE EMBODIMENTS

Figure 3:
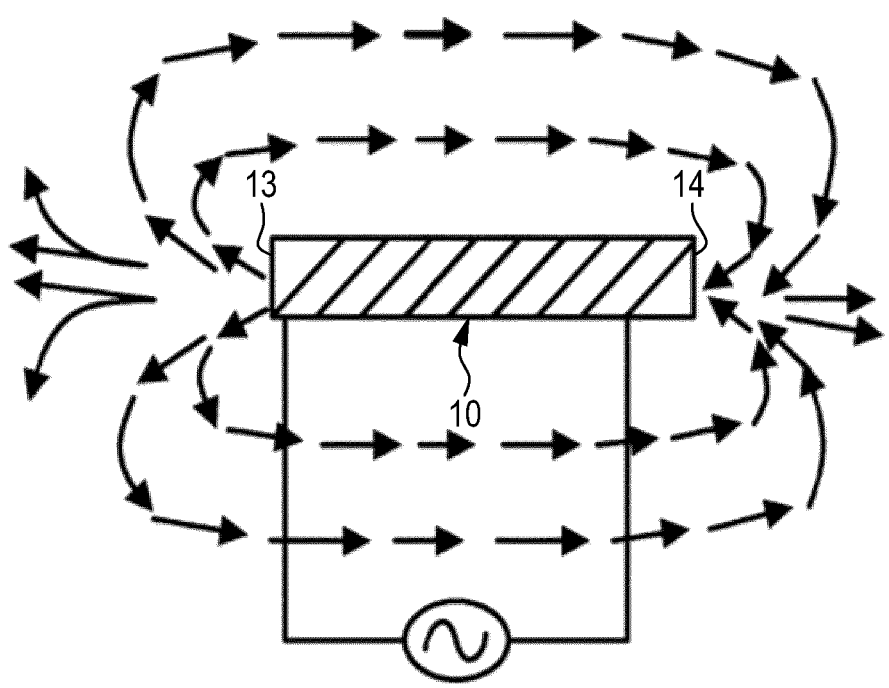
FIG. 3 illustrates the magnetic field of a conventional solenoid coil antenna.

Referring now to the drawings, wherein like reference numerals designate identical or corresponding parts throughout the several views, FIG. 1 shows a first embodiment of an antenna 1 according to the present disclosure in a cross-sectional side view (FIG. 1A) and a top view (FIG. 1B). The antenna 1 comprises a coil element 10, a first metallic plate element 20, a second metallic plate element 30 and multiple terminals 40-43.

The coil element 10 comprises a core element 11 and a coil 12 wound around the core element 11. The core element 11 is arranged along a longitudinal direction L and has a first front surface 13 and a second front surface 14. The core element 11 is generally made of magnetic material, e.g. as a ferrite rod, with a high magnetic permeability to confine and guide a magnetic field generated by the current carried by the coil 12. The core element 11 may have a quadratic or round cross section with a diameter in the range of 5% to 30% the length of the coil element 10. The coil 12 may be formed as a solenoid coil (or loop), and the number of windings of the coil 12 may be in the range of 2 to 100, preferably in the range of 5 to 30.

The first metallic plate element 20 is arranged on a first side of the core element 11 (in FIG. 1A above the core element 11). It extends with its first end 21 in said longitudinal direction L beyond the first front surface 13 of the core element 11 and is arranged with its second end 22 in said longitudinal direction L adjacent the core element 11.

The second metallic plate element 30 is arranged on a second side of the core element 11 (in FIG. 1A below the core element 11) opposite said second side. It extends with its first end 31 in said longitudinal direction L beyond the second front surface 14 of the core element 11 and is arranged with its second end 32 in said longitudinal direction L adjacent the core element 11. The coil element 10 is thus sandwiched between the first and second metallic plate elements 20 and 30, which increase the efficiency of the coil element 10 since a loop type antenna generally is an inefficient radiator. In this way, an antenna with the desired small size is capable to redirect the radiated magnetic field from horizontal to vertical radiation direction and increase the efficiency of the antenna in a given direction.

A first terminal 40 and a second terminal 41 are connected to the coil 10 to input (feed) an RF signal to the coil 10 and to output a signal from the coil 10. A third terminal 42 is connected to the first metallic plate element 20 and a fourth terminal 43 is connected to the second metallic plate element 30 to input (feed) RF signals to the respective plate element and to output RF signals from the respective plate element.

In the embodiment of the antenna 1 shown in FIG. 1, the first metallic plate 20 and the second metallic plate element 30 do not overlap, but the first end 21 of the first metallic plate element 20 and the first end 31 of the second metallic plate 30 are substantially arranged in the same symmetry plane P that is arranged perpendicular to the longitudinal direction L.

The first metallic plate element 20 and the second metallic plate element 30 each have the shape of a triangle (or V) or an isosceles trapezoid. Generally, the first metallic plate element 20 and the second metallic plate element 30 each may generally have any shape which can meet the requirements of transmitting and receiving NFC and UWB signals. The dimensions of the metallic plates 20, 30 influence the operating frequency band for each technology and may thus be selected according to the desired operating frequency bands. Together, in this embodiment the plate elements 20 and 30 have the shape of a butterfly in the top view shown in FIG. 1B. Further, the first metallic plate element 20 and the second metallic plate element 30 are mirror symmetric with respect to the symmetry plane P.

FIG. 2 shows a second embodiment of an antenna 2 according to the present disclosure in a cross-sectional side view (FIG. 2A) and a top view (FIG. 2B). In this embodiment the first metallic plate element 20 and said second metallic plate element 30 are arranged such that they overlap each other in the longitudinal direction L, i.e. the two metallic plates 20, 30 are positioned (or staggered) in two superposed cantilever overhangs. In an embodiment the size of the overlap 50 between the first metallic plate element 20 and the second metallic plate element 30 in the longitudinal direction L is in the range of 0.1% to 50% (or even more) of the length of the core element 11 in the longitudinal direction L.

FIG. 3 illustrates the magnetic field of a conventional solenoid coil antenna (sometimes also called loop antenna) to explain the basic principal functionality. It is well known that an electric current carried in the wire of a coil generates a magnetic field around it. The amount of magnetic field generated by the current depends on several parameters such as the number of turns, wire section, wire length but also on the geometry of the currents shape path. If the coil is fed with an electrical current, it creates a magnetic field which will travel from one edge 13 (i.e. one front surface of the core) to another edge 14 as shown in FIG. 3.

The magnetic field lines are horizontally distributed from one edge to another edge. Such a magnetic field distribution is weak, and it is difficult to collect the maximum field amount. The magnetic field lines are tied to the core. The capture of the whole magnetic field is problematic, even if a second received antenna is positioned horizontally.

Figure 4:
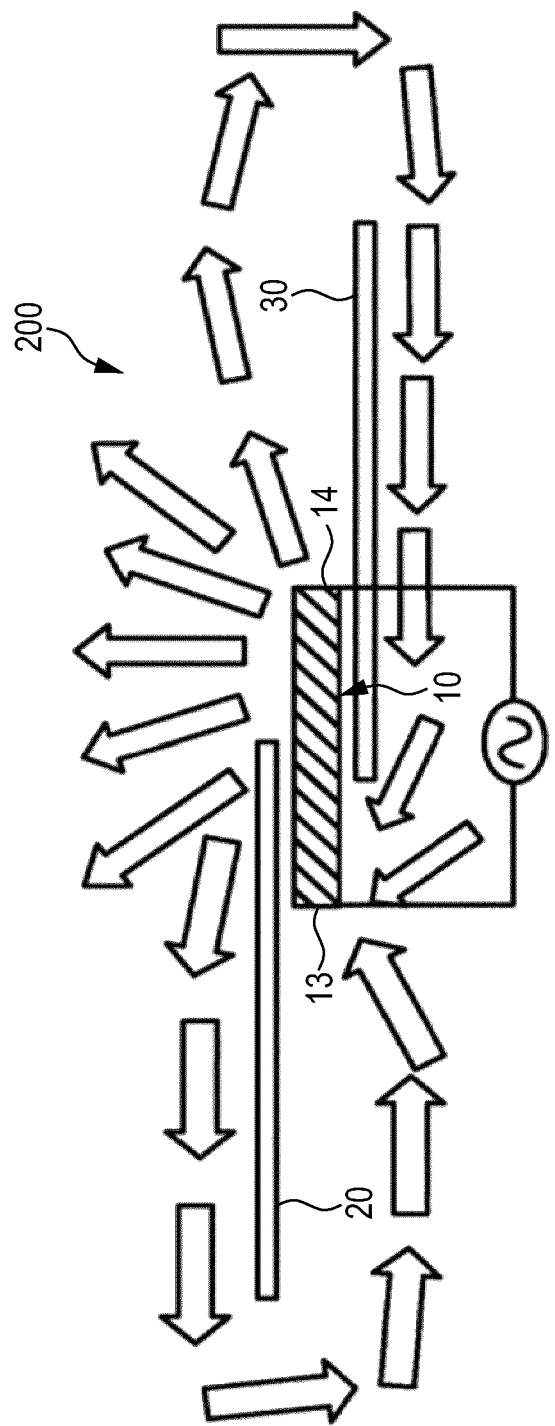
FIG. 4 illustrates the magnetic field of an antenna according to the present disclosure.

In order to solve this problem the track of the magnetic field lines is inverted from horizontal to vertical by the design of the antenna of the present disclosure. The magnetic field goes directly from one edge to another using the shortest pathway, but the present disclosure modifies the pathway of these magnetic field lines in order to collect the majority of the magnetic field. By placing the coil element 10 in between the two metallic plate elements 20, 30 in a cantilever overhang, as shown in FIGS. 1 and 2, the magnetic field will be redirected from its shortest route to follow the newly shaped pathway, as schematically shown in FIG. 4, using the metallic plate elements 20, 30 as guides.

As the magnetic field will always run as a loop, the modified pathway will force the emerged magnetic fields to go first vertically and make a big turn before catching up the other edge of the core element 11 to close the magnetic loop. By doing so, the pathway of the magnetic field lines has partly (in the area 200) been changed into vertical direction where a receive antenna can collect the majority of this magnetic field. The antenna according to the present disclosure can thus be made of small size and achieves an improved performance, which are essential advantages e.g. for implementation of an antenna in small NFC devices.

Figure 5A:
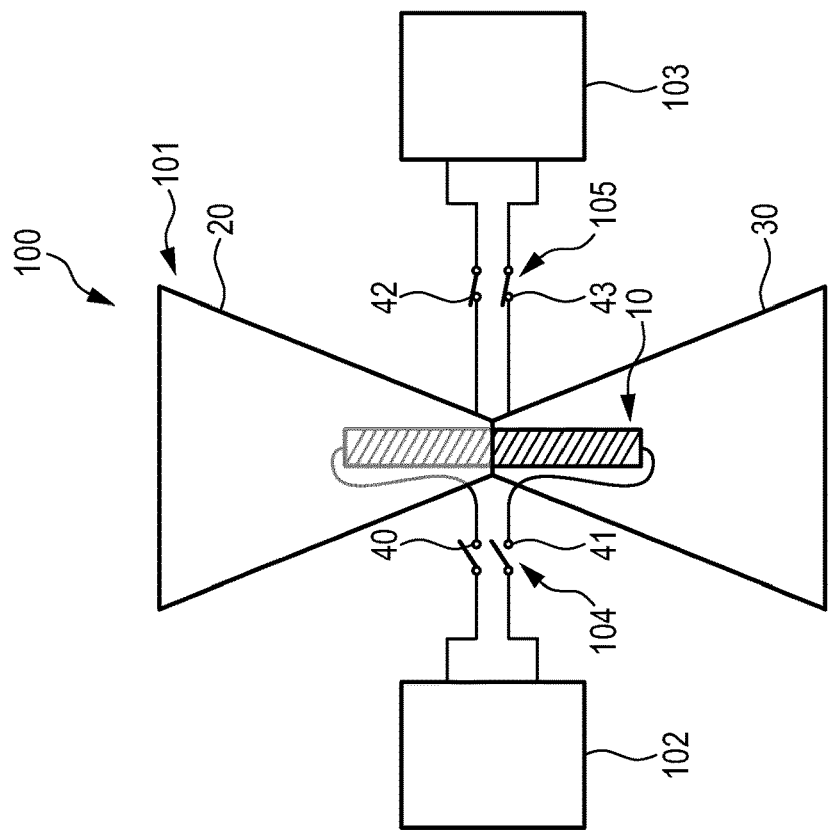
FIGS. 5A, 5B show a diagram of different operation states of an embodiment of an antenna arrangement according to the present disclosure.
Figure 5B:
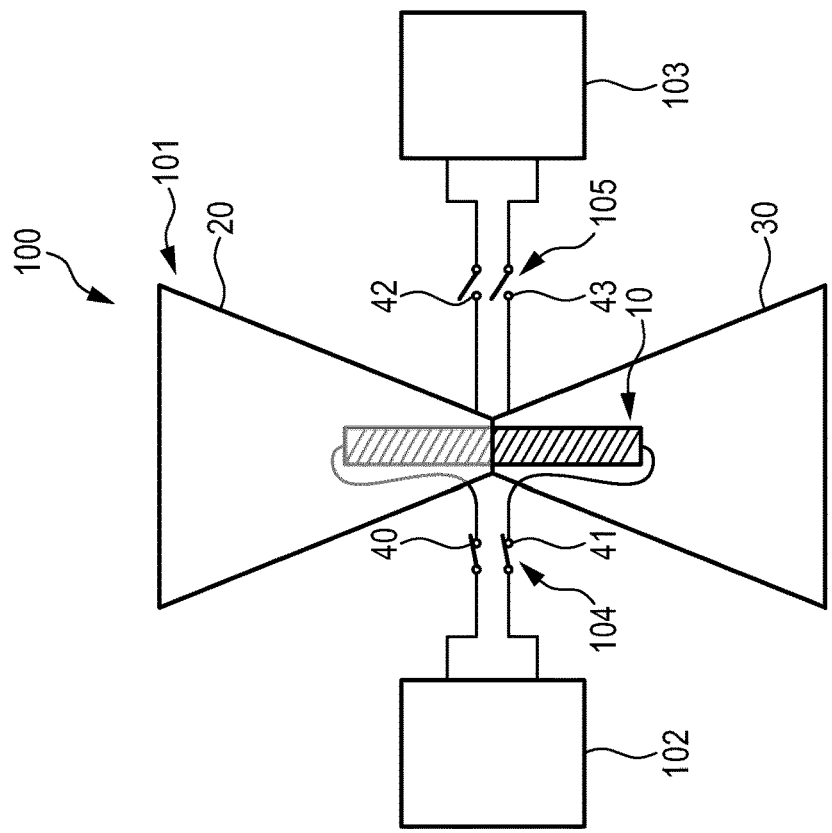

FIGS. 5A and 5B show diagrams of different operation states of an embodiment of an antenna arrangement 100 according to the present disclosure. The antenna arrangement 100 comprises an antenna 101 according to the present disclosure (e.g. an antenna 1 as shown in FIG. 1 or an antenna 2 as shown in FIG. 2), a first feeding circuit 102 (also called feeding network) connected to the first and second terminals 40 and 41 and a second feeding circuit 103 (feeding network) connected to the third and fourth terminals 42, 43. The first feeding circuit 102 is configured to feed a first signal, in particular to feed a near field communication (NFC) signal, to the coil element 10. The second feeding circuit 103 is configured to feed a second signal, in particular an ultra-wideband (UWB) signal, to the first and second plate elements 20, 30. Transmission line (e.g. microstrip lines may be used for feeding the signals from the feeding circuits to the respective components of the antenna.

Switches are provided in the paths between the feeding circuits and the respective terminals to individually control the feeding. In particular, a first switch 104 is arranged between the first feeding circuit 102 and the first and/or second terminals 40, 41, and a second switch 105 is arranged between the second feeding circuit 103 and the third and/or fourth terminals 42, 43. It is thus possible to operate the antenna 101 as NFC antenna or as UWB antenna by opening and closing the respective switches 104, 105. In the state shown in FIG. 5A the first switch 104 is closed and the second switch 105 is open so that the antenna 101 is operated as NFC antenna. In the state shown in FIG. 5B the first switch 104 is open and the second switch 105 is closed so that the antenna 101 is operated as UWB antenna. Even a simultaneous operation as NFC antenna and UWB antenna is generally possible if both switches 104, 105 are closed.

According to the present disclosure the metallic plate structure is thus re-used for establishing coupling between a signal supply and a broadband antenna to operate in the UWB frequency band (6 to 10 GHZ). The signal supply thereby delivers a signal to the antenna, i.e. the metallic plates 20, 30, at a connection locus including one edge 22 of the first metallic plate 20 and one edge 32 of the second metallic plate 30 acting as a dipole antenna. The second feeding circuit 103 is adapted to the high frequency signal and is different from the first feeding circuit 102.

The present disclosure thus provides a combination antenna (also called combo type antenna) which transmits and/or receives RF signals of two technologies, for instance of NFC and UWB. It may even be extended to more than two technologies. Generally, the two technologies are separated from each other in terms of frequency of operation. For instance, NFC is operating in a lower frequency band (13.56 MHZ) with small bandwidth (few KHz) and UWB is operating in a higher frequency operation (3.1 to 10.6 GHZ) with very high bandwidth (500 MHZ).

Even in case of a large discrepancy between the respective frequencies of operation, the disclosed antenna can be built within a same module and share the same radiating elements. The transmission and reception of RF signal may be managed by means of synchronized switches at each end of the transmission line. The synchronization may be managed in the digital domain (i.e. in time-division multiplexing method).

Today's mobile devices are getting overloaded with wireless communication systems, each system requiring a separate antenna due to its dedicated operating frequency band. For instance, there are at least eight wireless communications systems in today's smartphones requiring the same number of transmit/receive antennas. The disclosed combo antenna covers two (or more) frequency usages that can be re-used for other wireless technologies. It may thus alleviate the condensed space in smart mobile devices and even allow the implementation of new functionalities. Moreover, it may avoid interference between different RF communications systems.

In further embodiments, as illustrated in FIGS. 6 to 9 of the antenna arrangement, more than two antennas can be combined to form an antenna array. Such embodiments can be used as beam steering antennas having a beam directional radiation pattern for transmitting and/or receiving high and/or low frequency signals. The dipole antenna (formed by the plates 20 and 30) can e.g. be operated in the frequency range between 6 and 10 GHz, but its operation is not limited to this frequency range. By use of a proper sizing of the antenna it can be adapted to operate in lower or higher frequency band. In such an antenna array, the number of radiating elements can be more than one. The antenna array can be arranged in a rectangular or linear grid.

In an embodiment a feeding network comprising a power divider, phase shifter and switch bank may be used for feeding the dipole antennas. Power dividers may be used to divide (in case of a transmit antenna) or sum (in case of a receive antenna) an equal signal strength to the antenna (transmitter) and therefore to the analog RF front end (receiver). Phase shifters may be used to shift the signal phase at each dipole antenna in order to obtain a desired radiation pattern direction. The number of power dividers and the number of phase shifters may be selected dependent on the number of radiation directions needed.

Figure 6:
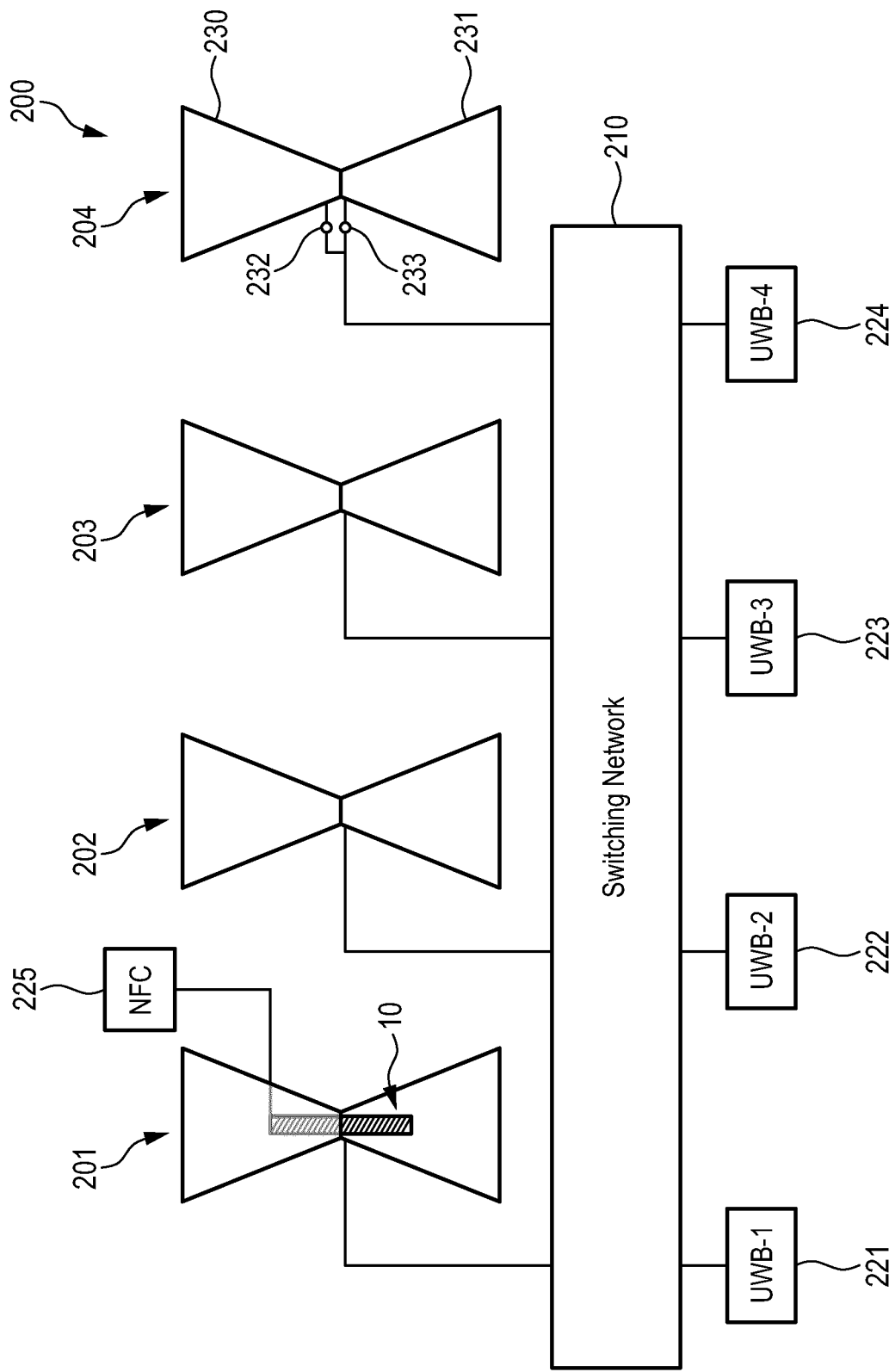
FIG. 6 shows a diagram of another embodiment of an antenna arrangement according to the present disclosure.

FIG. 6 shows a diagram of another embodiment of an antenna arrangement 200 according to the present disclosure. In addition to the antenna 201, which may be an antenna an antenna 1 or 2 as shown in FIG. 1 or 2, the antenna arrangement 200 further comprises one or more (in this exemplary embodiment three) additional antennas 202, 203, 204. Further, a switching network 210 is arranged between the antennas 201, 202, 203, 204 and second feeding circuits 221, 222, 223, 224 in order to separately control the feeding of signals to the respective antennas 201, 202, 203, 204. Further, a first feeding circuit 225 for feeding the coil element 10 of the antenna 201.

While the first antenna 201 can be operated in two different modes (e.g. NFC mode and UWB mode), the other antennas 202, 203, 204 can only be operated in the second mode (e.g. UWB mode) since they do not comprise a coil element 10 like the first antenna. In the embodiment shown in FIG. 6, each of the additional antennas 202, 203, 204 comprises (only indicated in FIG. 6 for the antenna 204) a first metallic plate element 230, a second metallic plate element 231, a third terminal 232 connected to the first metallic plate element 230 and a fourth terminal 233 connected to the second metallic plate element 231. The first metallic plate element 230 and the second metallic plate element 231 of the one or more of the additional antennas 202, 203, 204 are mirror symmetric with respect to a symmetry plane that is perpendicular to the longitudinal direction. The third and fourth terminals 232, 233 of the one or more additional antennas 202, 203, 204 are connected to the second feeding circuit 222, 223, 224, in this embodiment via the switching network 210.

In the embodiment shown in FIG. 6 the first metallic plate element 230 and the second metallic plate element 231 of the additional antennas 202, 203, 204 each have the shape of a triangle or an isosceles trapezoid, i.e. the same shape as the metallic plate elements of the antenna 201. Generally, it is possible, however, that the shape of the metallic plate elements of the additional antennas 202, 203, 204 is different than the shape of the metallic plate elements of the antenna 201. Furthermore, each one of the antennas 201, 202, 203, 204 may have plate elements with individual shapes.

Figure 7:
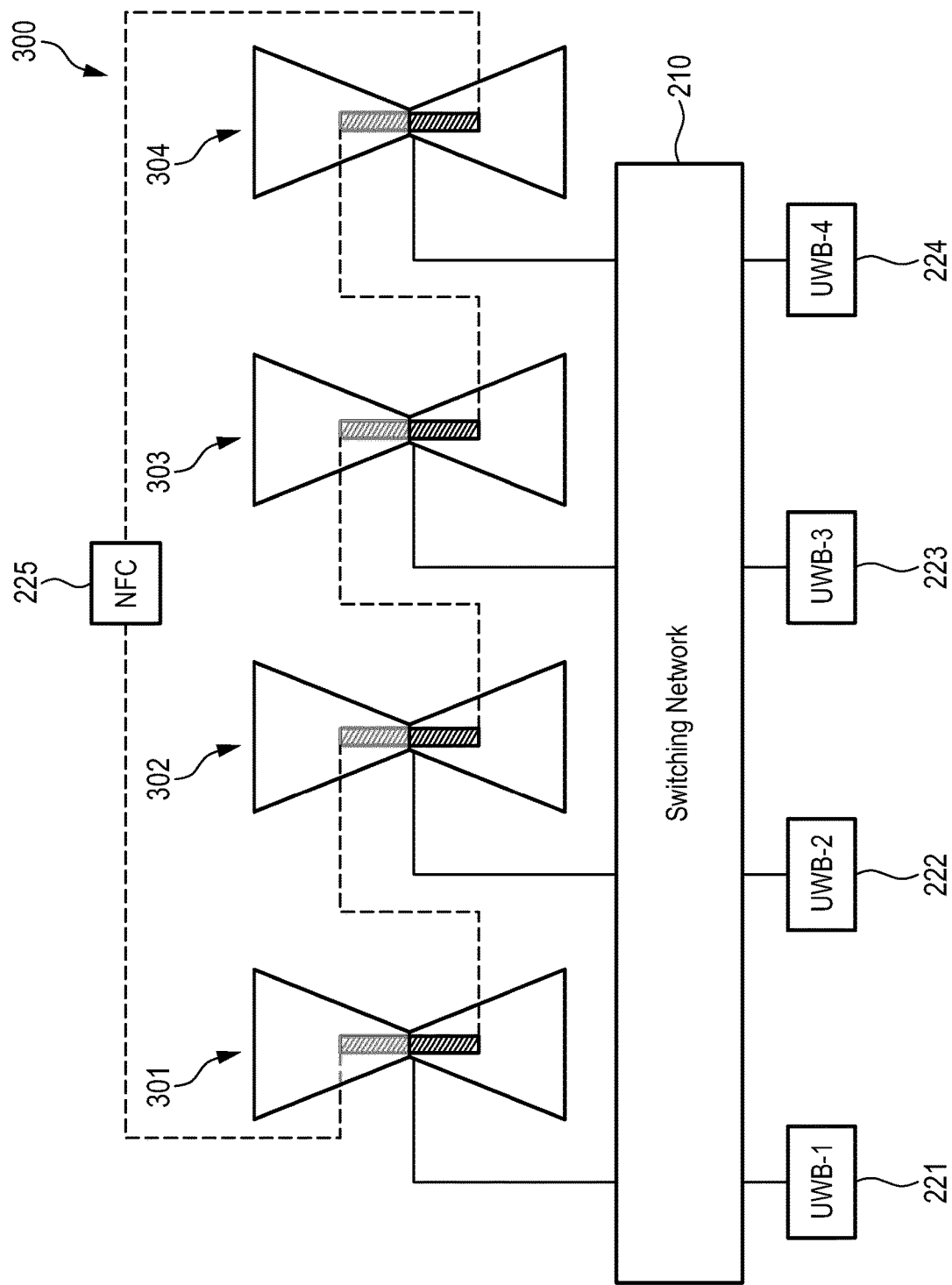
FIG. 7 shows a diagram of another embodiment of an antenna arrangement according to the present disclosure.
Figure 8:
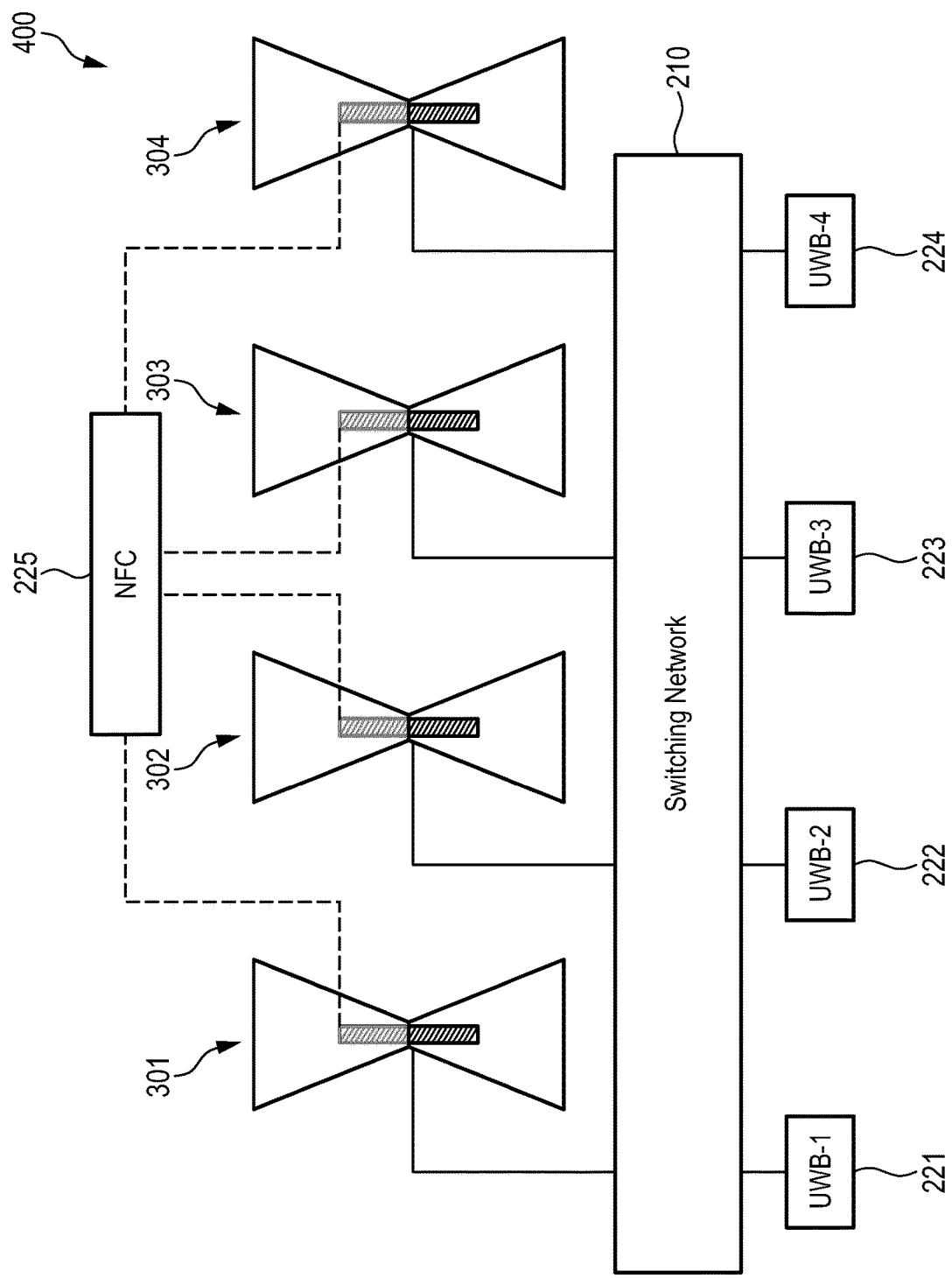
FIG. 8 shows a diagram of another embodiment of an antenna arrangement according to the present disclosure.

FIGS. 7 and 8 show diagrams of further embodiments of an antenna arrangement 300, 400 according to the present disclosure. In addition to the antenna 301, which may be an antenna an antenna 1 or 2 as shown in FIG. 1 or 2, the antenna arrangements 300, 400 further comprise one or more additional antennas 302, 303, 304, which are all substantially identical to the antenna 301, i.e. are configured like an antenna as disclosed herein. The coils of the coil elements of the antennas 301, 302, 303, 304 are connected in series in the antenna arrangement 300 or in parallel in the antenna arrangement 400. The first feeding circuit 225 thus either connects to the antennas 301 and 304 in the antenna arrangement 300 or in parallel in the antenna arrangement 400.

Hence, all antennas 301, 302, 303, 304 can be operated in the first or second operation mode, wherein all antennas 301, 302, 303, 304 are generated in the same mode at a time. In an embodiment in each connection between a feeding circuit and an antenna, a separate switch may be provided to individually feed and control each antenna.

Figure 9:
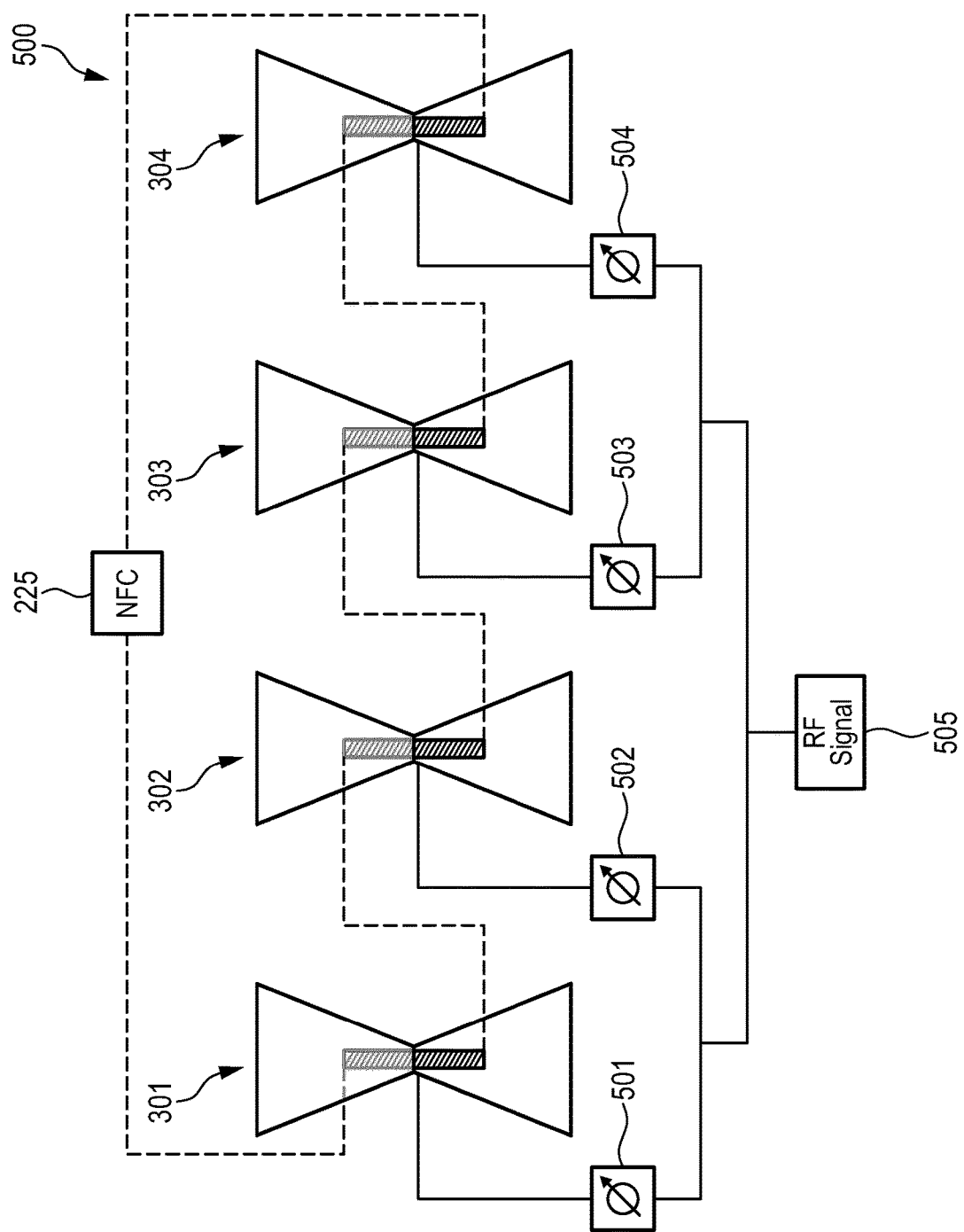
FIG. 9 shows a diagram of another embodiment of an antenna arrangement according to the present disclosure.

FIG. 9 shows a diagram of another embodiment of an antenna arrangement 500 according to the present disclosure. In addition to the elements of the antenna arrangement 300 shown in FIG. 7, the antenna arrangement 500 further comprises, per antenna 301, 302, 303, 304, an additional phase shifter 501, 502, 503, 504 (preferably broadband phase shifters) and/or an additional power divider (not shown) arranged between the second feeding circuit 505 and the respective phase shifters 501, 502, 503, 504. It shall be noted that such additional elements (phase shifters and/or power dividers) may be provided in other embodiments of the antenna arrangement as well.

FIGS. 10A to 10D show cross-sectional side views of further embodiments of an antenna according to the present disclosure.

FIG. 10A shows an antenna 3, in which the first metallic plate element 20 and the second metallic plate element 30 each comprises, at its respective second end 22, 32 a respective feeding lines 23, 33. Further, feeding lines 15, 16 are optionally arranged at the first and second front surfaces 13, 14 of the core element 11.

FIG. 10B shows an antenna 4, in which metal elements representing the metallic plate elements 20, 30 are placed on PCB elements 60, 61. The metal elements may be placed on a first surface facing the coil element 10 or on a second surface facing away from the coil element 10. This provides that the metallic plate elements 20, 30 can be securely held in place by the PCB elements 60, 61. In between the first metallic plate element 20 and the coil element 10 a gap is provided. A similar gap is provided by the PCB element 61 between the coil element 10 and the metallic plate element 30. The gap between the PCT elements 60 and 61 may also be filled with some material (e.g. foam) whose permittivity is close to air (i.e. having $E_r \sim 1$)

FIG. 10C shows an antenna 5, in which a part of a housing 70 (e.g. the metal body or chassis of a device integrating the antenna 5) represents a metallic plate element (here the metallic plate element 20) of the antenna. The coil element 10 and the second metallic plate element 30 may be assembled on a printed circuit board 71. This provides that no extra metallic plate element needs to be provided but can be represented by part of the device itself.

FIG. 10D shows an antenna 6, in which a battery 80 represents a metallic plate element (here the second metallic plate element 30) of the antenna. The coil element 10 is assembled on printed circuit board 81, on the other side of which the battery 80 is placed. The first metallic plate element 10 is placed on another PCB element 82 or is part of the device itself, which is preferably not made from metal.

There are various parameters and dimensions of the disclosed antenna, which may be optimized to design the magnetic field and improve the desired effect, in particular strength and direction of the magnetic field. These will be explained in the following.

The first end 21 of the first metallic plate element 20 preferably extends by a factor in the range of 100% to 500% of the length of the core element 11 in the longitudinal direction L beyond the center of the core element 11. The first end 31 of the second metallic plate element 30 preferably extends by a factor in the range of 100% to 500% of the length of the core element 11 in the longitudinal direction L beyond the center of the core element 11.

The second end 22 of the first metallic plate element 20 extends by a factor in the range of 50% to 75% of the length of the core element 11 in the longitudinal direction L beyond the first front surface 13 of the core element 11. The second end 32 of the second metallic plate element 30 extends by a factor in the range of 50% to 75% of the length of the core element 11 in the longitudinal direction L beyond the second front surface 14 of the core element 11.

In an embodiment the first metallic plate element 20 and/or the second metallic plate element 30 extends beyond the coil element 10 in a lateral direction orthogonal to the longitudinal direction L.

The thickness of the first metallic plate element 20 and/or the second metallic plate element 30 is preferably in the range of at least ten micrometers or more. Preferably the first and second metallic plate elements have identical shape and identical dimensions.

The first metallic plate element 20 and/or the second metallic plate element 30 is preferably arranged with respect to the coil element 10 with a gap in between. The gap should generally be small to avoid that too much of the magnetic field flux goes through said gap. The gap is preferably in a range of 5% to 20% of the size of the overlap 50 (shown in FIG. 2) wherein the gaps are preferably of identical size. Another way of designing the size of the gaps is that the size of the gaps is in the range of 2-4 times (e.g. 3 times) smaller than the thickness of the core element 11.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

It follows a list of further embodiments of the disclosed subject matter:

1. An antenna comprising:
   a coil element comprising a core element and coil wound around the core element, said core element being arranged along a longitudinal direction and having a first front surface and a second front surface,
   a first metallic plate element arranged on a first side of the core element, wherein said first metallic plate element extends with its first end in said longitudinal direction beyond the first front surface of the core element and is arranged with its second end in said longitudinal direction adjacent the core element,
   a second metallic plate element arranged on a second side of the core element opposite said second side, wherein said second metallic plate element extends with its first end in said longitudinal direction beyond the second front surface of the core element and is arranged with its second end in said longitudinal direction adjacent the core element, a first terminal and a second terminal, both connected to the coil, and a third terminal connected to the first metallic plate element and a fourth terminal connected to the second metallic plate element, wherein the first metallic plate element and the second metallic plate element each have the shape of a triangle or an isosceles trapezoid and wherein the first metallic plate element and the second metallic plate element are mirror symmetric with respect to a symmetry plane that is perpendicular to the longitudinal direction.

2. The antenna as defined in any one of the preceding embodiments, wherein the first metallic plate element and the second metallic plate element have an identical shape.

3. The antenna as defined in any one of the preceding embodiments, wherein the first metallic plate element and the second metallic plate element overlap each other in the longitudinal direction.

4. The antenna as defined in any one of the preceding embodiments, wherein the first metallic plate element and the second metallic plate element do not overlap each other in the longitudinal direction.

5. The antenna as defined in any one of the preceding embodiments, wherein the first metallic plate element and/or the second metallic plate element and/or the coil element is arranged on a printed circuit board or at a part of the housing and/or an internal element of a device including the antenna.

6. The antenna as defined in any one of the preceding embodiments, wherein the first metallic plate element and/or the second metallic plate element is represented by a part of the housing and/or an internal element of a device including the antenna.

7. The antenna as defined in any one of the preceding embodiments, wherein the first end of the first metallic plate extends beyond the center of the core element.

8. The antenna as defined in any one of the preceding embodiments, wherein the first end of the first metallic plate extends by a factor in the range of 100% to 500% of the length of the core element in the longitudinal direction beyond the center of the core element.

9. The antenna as defined in any one of the preceding embodiments, wherein the first end of the second metallic plate extends beyond the center of the core element.

10. The antenna as defined in any one of the preceding embodiments, wherein the first end of the second metallic plate extends by a factor in the range of 100% to 500% of the length of the core element in the longitudinal direction beyond the center of the core element.

11. The antenna as defined in any one of the preceding embodiments, wherein the size of the overlap between said first metallic plate element and said second metallic plate element in the longitudinal direction is in the range of 0.1% to 50% of the length of the core element in the longitudinal direction.

12. The antenna as defined in any one of the preceding embodiments, wherein the second end of the first metallic plate extends by a factor in the range of 0.1% to 50% of the length of the core element in the longitudinal direction beyond the first front surface of the core element.

13. The antenna as defined in any one of the preceding embodiments, wherein the second end of the second metallic plate extends by a factor in the range of 0.1% to 50% of the length of the core element in the longitudinal direction beyond the second front surface of the core element.

14. The antenna as defined in any one of the preceding embodiments, wherein the first metallic plate element and/or the second metallic plate element extends beyond the coil element in lateral direction orthogonal to the longitudinal direction.

15. The antenna as defined in any one of the preceding embodiments, wherein the first metallic plate element and/or the second metallic plate element have a thickness in the range of at least 10 μm.

16. The antenna as defined in any one of the preceding embodiments, wherein the first metallic plate element and/or the second metallic plate element is arranged with respect to the coil element with a gap in between, said gap being in a range of 5% to 20% of the size of the overlap.

17. The antenna as defined in any one of the preceding embodiments, wherein the core element has a quadratic or round cross section with a diameter in the range of 5% to 30% of the length of the coil element.

18. The antenna as defined in any one of the preceding embodiments, wherein the number of windings of the coil is in the range of 15 to 30.

19. An antenna arrangement comprising:

an antenna as defined in any one of the preceding claims, a first feeding circuit connected to the first and second terminals, the first feeding circuit being configured to feed a first signal to the coil, and a second feeding circuit connected to the third and fourth terminals, the second feeding circuit being configured to feed a second signal to the first and second plate elements.

20. The antenna arrangement as defined in embodiment 19, further comprising a first switch arranged between the first feeding circuit and the first and/or second terminals, and a second switch arranged between the second feeding circuit and the third and/or fourth terminals.

21. The antenna arrangement defined in embodiment 19 or 20, wherein the first feeding circuit is configured to feed a near field communication signal.

22. The antenna arrangement as defined in any one of embodiments 19 to 21, wherein the second feeding circuit is configured to feed an ultra-wideband signal.

23. The antenna arrangement as defined in any one of embodiments 19 to 22, further comprising one or more additional antennas, each having
a first metallic plate element
a second metallic plate element
a third terminal connected to the first metallic plate element and a fourth terminal connected to the second metallic plate element,
wherein the first metallic plate element and the second metallic plate element of the one or more additional antennas are mirror symmetric with respect to a symmetry plane that is perpendicular to the longitudinal direction, and
wherein the third and fourth terminals of the one or more additional antennas are connected to the second feeding circuit.

24. The antenna arrangement as defined in embodiment 23,
wherein the first metallic plate element and the second metallic plate element of the one or more additional antennas each have the shape of a triangle or an isosceles trapezoid, 25. The antenna arrangement as defined in any one of embodiments 19 to 24, further comprising one or more additional antennas as defined in claim 1, wherein the coils are connected in series or in parallel.

26. The antenna arrangement as defined in embodiment 24 or 25,
further comprising one or more additional second switches arranged between the second feeding circuit and the third and/or fourth terminals of the one or more additional antennas.

27. The antenna arrangement as defined in embodiment 24 or 25,
further comprising a power divider and/or a broadband phase shifter between the second feeding circuit and each of the antenna and the one or more additional antennas.

The invention claimed is:

1. An antenna comprising:
a coil element comprising a core element and coil wound around the core element, said core element being arranged along a longitudinal direction and having a first front surface and a second front surface,
a first metallic plate element arranged on a first side of the core element, wherein said first metallic plate element extends with its first end in said longitudinal direction beyond the first front surface of the core element and is arranged with its second end in said longitudinal direction adjacent the core element,
a second metallic plate element arranged on a second side of the core element opposite said second side, wherein said second metallic plate element extends with its first end in said longitudinal direction beyond the second front surface of the core element and is arranged with its second end in said longitudinal direction adjacent the core element,
a first terminal and a second terminal, both connected to the coil, and
a third terminal connected to the first metallic plate element and a fourth terminal connected to the second metallic plate element,
wherein the first metallic plate element and the second metallic plate element each have the shape of a triangle or an isosceles trapezoid,
the first metallic plate element and the second metallic plate element being oriented to have bases of their respective triangular or isosceles trapezoid shapes furthest from a center of the core element along the longitudinal direction, and
wherein the first metallic plate element and the second metallic plate element are mirror symmetric with respect to a symmetry plane that is perpendicular to the longitudinal direction.

2. The antenna as claimed in claim 1, wherein the first metallic plate element and the second metallic plate element have an identical shape.

3. The antenna as claimed in claim 1, wherein the first metallic plate element and the second metallic plate element overlap each other in the longitudinal direction.

4. The antenna as claimed in claim 1, wherein the first metallic plate element and/or the second metallic plate element and/or the coil element is arranged on a printed circuit board or at a part of the housing and/or an internal element of a device including the antenna.

5. The antenna as claimed in claim 1, wherein the first metallic plate element and/or the second metallic plate element is represented by a part of the housing and/or an internal element of a device including the antenna.

6. An antenna arrangement comprising:
an antenna as defined in claim 1,
a first feeding circuit connected to the first and second terminals, the first feeding circuit being configured to feed a first signal to the coil, and
a second feeding circuit connected to the third and fourth terminals, the second feeding circuit being configured to feed a second signal to the first and second plate elements.

7. The antenna arrangement as claimed in claim 6, further comprising
a first switch arranged between the first feeding circuit and the first and/or second terminals, and
a second switch arranged between the second feeding circuit and the third and/or fourth terminals.

8. The antenna arrangement as claimed in claim 6, wherein the first feeding circuit is configured to feed a near field communication signal.

9. The antenna arrangement as claimed in claim 6, wherein the second feeding circuit is configured to feed an ultra-wideband signal.

10. The antenna arrangement as claimed in claim 6, further comprising one or more additional antennas, each having
a first metallic plate element
a second metallic plate element
a third terminal connected to the first metallic plate element and a fourth terminal connected to the second metallic plate element,
wherein the first metallic plate element and the second metallic plate element of the one or more additional antennas are mirror symmetric with respect to a symmetry plane that is perpendicular to the longitudinal direction, and
wherein the third and fourth terminals of the one or more additional antennas are connected to the second feeding circuit.

11. The antenna arrangement as claimed in claim 10, wherein the first metallic plate element and the second metallic plate element of the one or more additional antennas each have the shape of a triangle or an isosceles trapezoid.

12. The antenna arrangement as claimed in claim 6, further comprising one or more additional antennas as defined in claim 1, wherein the coils are connected in series or in parallel.

13. The antenna arrangement as claimed in claim 11, further comprising one or more additional second switches arranged between the second feeding circuit and the third and/or fourth terminals of the one or more additional antennas.

14. The antenna arrangement as claimed in claim 11, further comprising a power divider and/or a broadband phase shifter between the second feeding circuit and each of the antenna and the one or more additional antennas.

15. The antenna arrangement as claimed in claim 12, further comprising one or more additional second switches arranged between the second feeding circuit and the third and/or fourth terminals of the one or more additional antennas.

16. The antenna arrangement as claimed in claim 12, further comprising a power divider and/or a broadband phase shifter between the second feeding circuit and each of the antenna and the one or more additional antennas.

17. The antenna as claimed in claim 1, wherein the core has a square cross section.

18. The antenna as claimed in claim 1, wherein the core has a round cross section.

19. The antenna as claimed in claim 1 wherein a diameter of the core is between 5% and 30% of a length of the core.

20. An antenna comprising:
   a coil element comprising a core element and coil wound around the core element, said core element being arranged along a longitudinal direction and having a first front surface and a second front surface,
   a first metallic plate element arranged on a first side of the core element, wherein said first metallic plate element extends with its first end in said longitudinal direction beyond the first front surface of the core element and is arranged with its second end in said longitudinal direction adjacent the core element,
   a second metallic plate element arranged on a second side of the core element opposite said second side, wherein said second metallic plate element extends with its first end in said longitudinal direction beyond the second front surface of the core element and is arranged with its second end in said longitudinal direction adjacent the core element,
   a first terminal and a second terminal, both connected to the coil, and
   a third terminal connected to the first metallic plate element and a fourth terminal connected to the second metallic plate element,
   wherein the first metallic plate element and the second metallic plate element each have the shape of a triangle or an isosceles trapezoid,
   wherein the first metallic plate element and the second metallic plate element are mirror symmetric with respect to a symmetry plane that is perpendicular to the longitudinal direction, and
   wherein the first metallic plate element and the second metallic plate element do not overlap each other in the longitudinal direction.

\* \* \* \* \*